UNITED STATES PATENT OFFICE.

NIELS C. CHRISTENSEN, OF SALT LAKE CITY, UTAH, ASSIGNOR TO METALLURGIC IMPROVEMENT CORPORATION, OF SALT LAKE CITY, UTAH, A CORPORATION OF UTAH.

PROCESS OF TREATING COPPER ORES BY LIXIVIATION WITH AN $SO_2$ SOLUTION.

1,316,351.     Specification of Letters Patent.     Patented Sept. 16, 1919.

No Drawing.     Application filed April 3, 1918. Serial No. 226,523.

*To all whom it may concern:*

Be it known that I, NIELS C. CHRISTENSEN, a citizen of the United States, residing at No. 637 East Ninth South street, in Salt Lake City, in the county of Salt Lake and State of Utah, have invented new and useful Improvements in the Processes of Treating Copper Ores by Lixiviation with an $SO_2$ Solution, of which the following is a specification.

This invention relates to improvements in the processes for the extraction of copper from ores by lixiviation of the ores with a sulfur dioxid solution and more particularly to such processes wherein the recovery of the copper from the solution obtained is effected by chemical precipitation. The objects of my invention are to effect complete solution of the copper, to completely precipitate the copper in the solution and this in a form suitable for complete reduction to the metal, and to completely remove the dissolving agent from the solution in form available for reuse. Further objects which I desire to achieve are the cyclic use of the gaseous and liquid reagents without accumulating impurities therein, the production of a high yield approaching the theoretical yield and the formation of a metal product of high grade.

In the processes hitherto known wherein a solution of sulfur dioxid has been used as a solvent the efficiency of the process has been greatly impaired by the formation of sulfate in the solution, which resulted in a loss of the reagent, sulfur dioxid, and in an incomplete precipitation of the copper. Attempts to recover the copper which had been converted into the sulfate resulted in the formation of a low grade product which can be efficiently handled only with difficulty. Furthermore, in these processes the conversion of the precipitate has not been efficiently performed and a proper coördination of the steps of the processes for most efficient cyclic operation has been wanting.

I have discovered that the formation of copper sulfate in the liquid phases of the various reactions of the process of treatment of the ores may be prevented and the efficiency and value of the product thereby increased, and furthermore that the various means and processes used may be combined with each other not only for the purpose mentioned but also to make more effective the reuse of the liquid and gaseous reagents.

In applying my invention to process for the treatment of ore I may modify the several steps of the process singly or in combination, as deemed advisable for the most economical and efficient operation.

In the preparation of the mill solution for use in leaching the ore by causing the absorption of sulfur dioxid I may take measures to prevent the formation of sulfates or sulfuric acid, this being most readily effected by removal of sulfur trioxid or sulfates from the sulfurous gases. This I may accomplish by effecting a reaction between the sulfur trioxid in the gases and water, resulting in the formation of sulfuric acid, which is stable, whereas the sulfurous acid formed by the sulfur dioxid is readily decomposable. For example, the fresh sulfurous gas supplied from the roaster or sulfur burner may be absorbed in water in a separate absorption system and the solution heated to drive off the pure sulfur dioxid, which is passed into the mill solution. Or the fresh gas may be brought into contact with water in a suitable tower or other absorption device, thereby forming sulfuric acid and removing the sulfur trioxid, and then passing the gases freed from sulfur trioxid into the mill solution. The sulfur trioxid present in the gases may thus be removed and the formation of sulfates due to its presence thereby prevented.

In the succeeding step of the process, viz., the lixiviation of the ore, I may avoid the formation of sulfates by the use of a strong solution of sulfur dioxid; by increasing the rapidity of solution by thorough agitation of the ore and solvent, and by exclusion of air from the chamber in which the reaction takes place. In my prior application Serial No. 118,156, filed Sept. 1, 1916, I have shown other advantages of the use of a strong solution of sulfur dioxid. A further advantage is that the formation of copper sulfate by reason of depletion of $SO_2$ in any portion of the solution in contact with the copper minerals in accordance with the reaction "$CuO$" + $3CuSO_3$ = $Cu_2SO_3 \cdot CuSO_3 + CuSO_4$ ("$CuO$" indicating the combined form of copper in the mineral) is avoided. I have further shown in the prior application named how this depletion of sulfur dioxid may be avoided and the agitation of the ore in contact with the solvent effected by injection of sulfur dioxid gas into the mixture of the ore and solvent. In accordance with my present invention air and sulfur trioxid are carefully excluded from the gases used.

The pregnant solution from the lixiviation should be protected against the absorption of any oxygen until the precipitation is completed. The precipitation of the copper from the pregnant solution by heating the solution and driving off the $SO_2$ involves the formation of a large amount of $CuSO_4$ as shown in the following reaction:

$4CuSO_3 \rightarrow Cu_2SO_3, CuSO_3 + CuSO_4 + SO_2$

One-fourth of the copper remains in solution as the sulfate. The precipitation may, however, be made complete by the addition of limestone during the process according to the following reactions, all the copper being secured as the cupro-cupric sulfite and the sulfate removed as calcium sulfate.

$CaCO_3 + 2H_2SO_3 = Ca(HSO_3)_2 + H_2O + CO_2$ $CuSO_4 + Ca(HSO_3)_2 = CuSO_3 + CaSO_4 + H_2SO_3$ $4CuSO_3 = Cu_2SO_3 \cdot CuSO_3 + CuSO_4 + SO_2$ but this involves the treatment of one-third of the copper as a sulfate, the loss of a large quantity of $SO_2$ in the calcium sulfate, and the contamination of the precipitate with the $CaSO_4$. My process avoids all these objections in the following manner: A sufficient amount of finely divided copper is added to the pregnant solution and the precipitating operation carried out as usual by heating the solution and driving off the excess $SO_2$. By this method all the copper is precipitated as the cupro-cupric sulfite and no copper sulfate is formed as shown in the following equation:

$2CuSO_3 + Cu \rightarrow Cu_2SO_3 \cdot CuSO_3$.

This precipitation may be carried out with coarse copper but as the sulfite forms a thin coating on the copper particles and prevents further action the copper should be in as fine a condition as possible so that a large excess of copper will not be needed. Even with the fine copper it will be necessary to use an excess to secure complete precipitation, but this excess is necessary in the next step of the process and is therefore not in any way disadvantageous. It would, of course, be possible to use coarse granules of copper for this precipitation and grind off the sulfite in a suitable pebble mill and return the cleaned copper particles for use again in the precipitation but the method of using the fine copper is much more suitable in the process. During the precipitation process the solution should be kept in vigorous agitation in order to bring the suspended copper particles in contact with all the solution. The fine copper dust used in this part of the process may be secured as later described, as it is produced in a suitable form in subsequent steps of the process. In case it is impossible to entirely avoid the formation of $CuSO_4$, enough $CaCO_3$ may be added to the solution to complete the precipitation of the last traces of copper not precipitated by the addition of the metallic copper.

The treatment of the cupro-cupric sulfite in order to return all the $SO_2$ to the mill solution without dilution with other gases and to avoid the formation of any $CuSO_4$ and to secure as high grade product as possible is the next step in the process which has not been solved in the older processes. If roasted without access of air the sulfite decomposes as shown below $3Cu_2SO_3, CuSO_3 = 4Cu_2O + CuSO_4 + 5SO_2$ The formation of the sulfate may be avoided by adding a little carbon during the roast as indicated in the following chemical equation:

$6Cu_2SO_3, CuSO_3 + 2C \rightarrow 9Cu_2O + 12SO_2 + CO_2 + CO$ but this involves the contamination of the $SO_2$ gas with $CO_2$, $CO$, and other volatile products of the reducing agent and the contamination of the copper product with ash, etc. In my process, I avoid these difficulties by adding finely divided copper to the cupro-cupric sulfite and heating without access of air securing pure $SO_2$ gas and a pure copper product as shown below $3Cu_2SO_3, CuSO_3 + 3Cu \rightarrow 6Cu_2O + 6SO_2$ A few minutes heating at 600 degrees C. will complete the reaction as the precipitate and copper are in a finely divided condition. As noted above, enough of an excess of copper is added in the precipitating operation to furnish the copper needed in the heating or roasting operation. This heating operation should be carried out in a closed vessel so as to prevent the admission of any air.

The $Cu_2O$ from the heating operation is then reduced to metallic copper by heating with a suitable reducing agent such as $CO$, or water gas, or carbon. Owing to the fine condition of the $Cu_2O$ a few minutes treatment at 600 degrees C. serves to reduce all the copper giving a fine powder which is used in the precipitation of the copper from the pregnant solution as described above. It is advantageous unless a fine precipitate is secured to grind the cupro-cupric sulfite before heating and reducing in order to secure as fine a copper powder as possible. My complete process is then carried out in a general way as follows:

The ore ground to suitable mesh, is agitated in a solution of $SO_2$ in water, this solution being kept free from any sulfuric acid or sulfates by removing all $SO_3$ from the $SO_2$ gases supplied to the mill solution. This agitation may be carried out by passing the pure $SO_2$ gas from the boiling and roasting operations through the pulp or by mechanical means, or by a combination of the two. The excess of $SO_2$ gas from this operation goes to the absorption system to make the mill solution. The pregnant solution is then separated from the lixiviated ore by filtration or countercurrent decantation. The required amount of finely divided copper is then added and the excess $SO_2$ boiled off and the copper precipitated. The copper precipitate is then removed from the barren solution and the impurities remaining in the hot barren solution such as iron sulfate, etc., are removed by adding lime or limestone. Any traces of copper remaining in the solution are first precipitated by adding $CaCO_3$ to the hot solution, however, and this precipitate returned to the mill for treatment. The clean hot solution is then cooled first by transferring part of its heat in a suitable counter current apparatus to pregnant solution before boiling the latter, and then further cooled in any suitable cooling tower. The so-cooled barren solution is then used for washing the lixiviated ore and then saturated with $SO_2$ to make the $SO_2$ solution for lixiviating more ore. The cupro-cupric sulfite precipitate carrying a sufficient excess of metallic copper from the boiling operation is heated or roasted without access of air and the $SO_2$ driven off. The pure $SO_2$ gases from the boiling and roasting operations are used in the agitation and lixiviation of the ore and the excess gases then passed on to the absorption system and absorbed in the wash solution to make a strong $SO_2$ solution for use in the lixiviation as before described. The $Cu_2O$ formed in this roasting operation is then reduced to metallic copper by heating with any suitable reducing agent and part of this copper powder is used in the precipitation and the sulfite roasting operations as described. The reduced copper may readily be melted in any suitable refining furnace to a more marketable form than the fine powder if desired.

From the foregoing description it is readily seen that the process is extremely simple and efficient and is theoretically perfect from a chemical standpoint, as there is no loss of chemicals and all the reagents except the reducing agent for the $Cu_2O$ are supplied in the process itself. Both the copper and the dissolving agent are practically completely removed from the pregnant solution so that there is no accumulation of weak solutions and loss due to running away weak and foul solutions. The copper is secured in the highest possible grade of product for shipment or refining. These features will be readily appreciated by all who are familiar in any degree with this branch of the metallurgical art.

No drawings are shown as the process is not dependent upon any particular form of apparatus and is so simple that any competent metallurgist would be able to make use of it from the description given. Tests have demonstrated the efficiency and practicability of each step of the process and the process as a whole. Some of the ores tested yielded as much as 98% of the copper in a product assaying over 98% copper.

The process is especially well suited to the treatment of the copper carbonate sandstone ores found in Utah, Arizona, Colorado, and other Western States and is also well suited to the treatment of the oxidized capping of the large porphyry deposits. It is also especially adapted for handling the heavy sulfid ores carrying copper. After roasting, these ores yield readily to the process and give excellent recoveries. In the case of these ores, the roaster gases furnish much more $SO_2$ than is used in the process and the cost for chemicals is therefore practically nothing.

By the terms "boiling" or "boiling off the excess $SO_2$," I do not mean that the solution is necessarily brought to the boiling point of water but that the temperature of the solution is raised to such a point that most of the free $SO_2$ is driven out of the solution.

As it would not be possible in the scope of a brief patent specification to give all the details of operation and minor changes which might arise in the application of the process to different ores, I do not desire to be limited entirely by the foregoing description but by the spirit and scope of the following claims.

Having described my process, what I claim as new and desire to patent is:

1. The process of treating copper ores for the recovery of the copper, which consists in lixiviating the ore with an $SO_2$ solution, separating the pregnant solution containing the copper from the lixiviated ore, adding metallic copper to said pregnant solution and boiling off the excess $SO_2$ and thereby precipitating the copper from said solution as a cupro-cupric sulfite.

2. The process of treating copper ores for the recovery of the copper, which consists in lixiviating the ore with an $SO_2$ solution free from soluble sulfates, separating the pregnant solution containing the copper from the lixiviated ore, adding metallic copper to said pregnant solution and boiling off the excess $SO_2$ and thereby precipitating the copper from said solution as a cupro-cupric sulfite.

3. The process of treating copper ores for the recovery of the copper, which consists in lixiviating the ore with an $SO_2$ solution, separating the pregnant solution containing the copper from the lixiviated ore, adding metallic copper to said pregnant solution and boiling off the excess $SO_2$ thereby precipitating the copper from said solution as a cupro-cupric sulfite, separating said precipitate from the hot barren solution and precipitating the sulfates remaining in said hot barren solution by adding limestone thereto and cooling the so treated barren solution and using it to make the $SO_2$ solution for the treatment of more ore.

4. The process of treating copper ores for the recovery of the copper which consists in lixiviating the ore with an $SO_2$ solution, separating the pregnant solution from the lixiviated ore and adding metallic copper to said pregnant solution and boiling off the excess $SO_2$ and precipitating the copper from said solution as a cupro-cupric sulfite, and heating the aforesaid precipitate mixed with metallic copper without access of air to drive off the $SO_2$ and using said $SO_2$ in the lixiviation of more ore.

5. The process of treating copper ores, which consists in absorbing $SO_2$ from gases from which the $SO_3$ and sulfates have first been removed, in a solution free from sulfates; lixiviating said ore with aforesaid $SO_2$ solution; agitating said mixture of ore and solution during lixiviation by passing pure $SO_2$ gas through said mixture; separating the pregnant solution containing the copper from the lixiviated ore; adding metallic copper to said pregnant solution and boiling off the excess $SO_2$ and precipitating the copper as a cupro-cupric sulfite; separating said sulfite from the hot barren solution; adding a lime compound to said hot barren solution and precipitating the remaining sulfates therefrom; cooling said hot barren solution and washing lixiviated ore therewith and absorbing $SO_2$ therein as above described to form the $SO_2$ solution for the lixiviation of more ore; heating the cupro-cupric sulfite precipitate, mixed with metallic copper, to drive off the $SO_2$; passing the $SO_2$ from aforesaid boiling and heating operation through a mixture of ore and $SO_2$ solution to assist in agitating said mixture; absorbing the residual $SO_2$ gas from the roasting and boiling operation, after passing through aforesaid mixture of ore and solution, in cooled barren solution as before mentioned to make an $SO_2$ solution for lixiviating more ore.

6. The process of treating copper ores for the recovery of the copper which consists in lixiviating said ore with an $SO_2$ solution, and precipitating the copper from the pregnant solution secured in lixiviating said ore by adding metallic copper and boiling off the excess $SO_2$.

7. The process of treating copper ores for the recovery of the copper which consists in lixiviating said ore with an $SO_2$ solution, and precipitating the copper from the pregnant solution secured in lixiviating said ore by adding metallic copper and boiling off the excess $SO_2$, and heating the copper precipitates secured as aforesaid mixed with metallic copper and driving off the $SO_2$.

8. The improvement in the process of treating copper ores with an $SO_2$ solution for the recovery of the copper which consists in precipitating the copper from the pregnant solution by adding metallic copper to said solution and boiling off the $SO_2$.

9. The improvement in the process of treating copper ores with an $SO_2$ solution for the recovery of the copper wherein cupro-cupric sulfite is precipitated which consists in heating the cupro-cupric sulfite precipitate mixed with metallic copper and without access of air to drive off the $SO_2$ from said precipitate.

10. The improvement in the process for the recovery of copper from copper ores wherein a sulfur dioxid solution is used which consists in heating the sulfur dioxid solution containing dissolved copper in the presence of an excess of metallic copper and subsequently heating the resulting precipitate containing the excess of metallic copper.

11. The improvement in the process of treating copper ores with a sulfur dioxid solution wherein cupro-cupric sulfite is precipitated which consists in heating the sulfite precipitate in the presence of finely divided metallic copper thereby driving off the sulfur dioxid.

12. The improvement in the process of treating copper ores with an $SO_2$ solution for the recovery of the copper wherein cupro-cupric sulfite is precipitated which consists in mixing metallic copper with the sulfite precipitate and heating and driving off the $SO_2$.

13. In the process for the recovery of copper from copper ores wherein said ores are lixiviated with a sulfur dioxid solution, heating said solution in the presence of copper, thereby precipitating cupro-cupric sulfite, and adding limestone to the resulting solution thereby precipitating sulfates and residual copper.

14. The process of treating copper ores for the recovery of the copper, which consists in lixiviating the ore with an $SO_2$ solution free from soluble sulfates, separating the pregnant solution containing the copper from the lixiviated ore, adding metallic copper to said pregnant solution and boiling off the excess $SO_2$ and thereby precipitating the copper from said solution as a cupro-cupric sulfite.

15. The process of treating copper ores for the recovery of the copper, which consists in lixiviating the ore with an $SO_2$ solution free from soluble sulfates, separating the pregnant solution containing the copper from the lixiviated ore, adding finely divided copper made from cupro-cupric sulfite to said pregnant solution and boiling off the excess $SO_2$ and thereby precipitating the copper as a cupro-cupric sulfite.

16. The process of treating copper ores for the recovery of the copper, which consists in lixiviating the ore with an $SO_2$ solution, separating the pregnant solution containing the copper from the lixiviated ore, adding metallic copper to said pregnant solution and boiling off the excess $SO_2$ thereby precipitating the copper from said solution as a cupro-cupric sulfite, separating said precipitate from the hot barren solution and precipitating the remaining sulfates therein by adding limestone thereto, and using it to make the $SO_2$ solution for the treatment of more ore.

17. The process of treating copper ores for the recovery of the copper which consists in lixiviating the ore with an $SO_2$ solution, separating the pregnant solution from the lixiviated ore and adding metallic copper to said pregnant solution and boiling off the excess $SO_2$ and precipitating the copper from said solution as a cupro-cupric sulfite, separating said precipitate from the hot barren solution and heating said precipitate mixed with metallic copper without access of air to drive off the $SO_2$ and using said $SO_2$ in the treatment of more ore.

18. The process of treating copper ores for the recovery of the copper which consists in lixiviating the ore with an $SO_2$ solution, separating the pregnant solution from the lixiviated ore and adding an excess of finely divided metallic copper made from cupro-cupric sulfite to said pregnant solution and boiling off the excess $SO_2$ and precipitating the copper as a cupro-cupric sulfite, separating said precipitate and the residual metallic copper from the hot barren solution, and heating the mixture of said precipitate and residual metallic copper without access of air to drive off the $SO_2$, and using said $SO_2$ in the treatment of more ore.

19. The process of treating copper ores for the recovery of the copper, which consists in lixiviating the ore with an $SO_2$ solution, separating the pregnant solution containing the copper from the lixiviated ore, adding finely divided metallic copper to said pregnant solution, and keeping said finely divided copper in suspension in said solution and heating said solution thereby driving off the excess $SO_2$ and causing the precipitation of the copper as a cupro-cupric sulfite.

20. The process of treating copper ores for the recovery of the copper which consists in lixiviating the ore with an $SO_2$ solution, separating the pregnant solution from the lixiviated ore, adding an excess of finely divided metallic copper to said pregnant solution, and keeping said finely divided copper in suspension in said solution and heating said solution thereby driving off the excess $SO_2$ and causing the precipitation of the copper as a cupro-cupric sulfite, removing said precipitate and the excess of metallic copper from the barren solution, heating said cupro-cupric sulfite together with said excess of metallic copper without access of air, thereby driving off the $SO_2$ and forming cuprous-oxid.

21. The process of precipitating copper from an $SO_2$ solution which consists in adding metallic copper to said solution and heating said solution and driving off the excess $SO_2$.

22. The process of precipitating copper from an $SO_2$ solution free from soluble sulfates, which consists in adding metallic copper to said solution and heating said solution and driving off the excess $SO_2$.

23. The process of precipitating copper from an $SO_2$ solution which consists in adding finely divided metallic copper to said solution and stirring and heating said solution and driving off the excess $SO_2$.

24. The treatment of cupro-cupric sulfite which consists in heating the cupro-cupric sulfite together with metallic copper and without access of air thereby driving off the $SO_2$ and forming cuprous-oxid.

NIELS C. CHRISTENSEN.

Witnesses:
THEODORE STEBBINS,
MARY WOOD.